(12) United States Patent
Chernetsov et al.

(10) Patent No.: US 11,610,692 B2
(45) Date of Patent: Mar. 21, 2023

(54) FAST-NEUTRON REACTOR FUEL ROD

(71) Applicant: STATE ATOMIC ENERGY CORPORATION "ROSATOM" ON BEHALF OF THE RUSSIAN FEDERATION, Moscow (RU)

(72) Inventors: Nikita Gennadevich Chernetsov, d. Chernoe (RU); Viktor Nikolaevich Leonov, Moscow (RU); Aleksey Borisovich Shevchenko, Balashikha (RU); Elena Aleksandrovna Rodina, Moscow (RU); Yuriy Vasilevich Chernobrovkin, Moscow (RU)

(73) Assignee: STATE ATOMIC ENERGY CORPORATION "ROSATOM" ON BEHALF OF THE RUSSIAN FEDERATION, Moscow (RU)

( * ) Notice: Subject to any disclaimer, the term of this patent is extended or adjusted under 35 U.S.C. 154(b) by 167 days.

(21) Appl. No.: 16/330,715

(22) PCT Filed: Sep. 1, 2017

(86) PCT No.: PCT/RU2017/000638
§ 371 (c)(1),
(2) Date: Mar. 5, 2019

(87) PCT Pub. No.: WO2018/044206
PCT Pub. Date: Mar. 8, 2018

(65) Prior Publication Data
US 2021/0012912 A1    Jan. 14, 2021

(30) Foreign Application Priority Data
Sep. 5, 2016   (RU) ............................ RU2016135828

(51) Int. Cl.
*G21C 3/12* (2006.01)
*G21C 3/338* (2006.01)
*G21C 1/02* (2006.01)

(52) U.S. Cl.
CPC ............... *G21C 3/12* (2013.01); *G21C 3/338* (2013.01); *G21C 1/028* (2013.01)

(58) Field of Classification Search
CPC ........... G21C 3/12; G21C 3/338; G21C 1/028
(Continued)

(56) References Cited

U.S. PATENT DOCUMENTS 3,361,640 A    1/1968  Hassig et al.
3,597,316 A *  8/1971  Lynworth ............ G21C 17/112
                                            376/247

(Continued)

FOREIGN PATENT DOCUMENTS

EP    2842134 B1       3/2017
JP    S5559387 U   *   4/1980
RU    2543609 C1       3/2015

OTHER PUBLICATIONS

International Search Report of corresponding international application No. PCT/RU2017/000638 dated Dec. 21, 2017, 2 pages (English translation); 2 pages (Russian).
(Continued)

*Primary Examiner* — Jack W Keith
*Assistant Examiner* — Daniel Wasil
(74) *Attorney, Agent, or Firm* — Brooks Kushman P.C.

(57) ABSTRACT

A fast-neutron nuclear reactor fuel assembly having fuel rods. Each fuel rod has nuclear fuel disposed in a sealed housing in the form of a tubular steel shell and end parts. A steel spacer element is wound in a coil with a specific pitch on the outside surface of the shell and is fastened on the end parts. The spacer element is in the form of a metallic band
(Continued)

twisted around its longitudinal axis. The width of said band is approximately equal to the minimum distance between adjacent fuel rods in the fuel assembly. A transverse cross-sectional area of the band is within a range from 0.10 to 0.50 times the area of a circle described around the width of the band.

7 Claims, 4 Drawing Sheets

(58) Field of Classification Search
USPC .................................................. 376/436, 454
See application file for complete search history.

(56) References Cited

U.S. PATENT DOCUMENTS 3,930,940 A * 1/1976 Cayol .................... G21C 3/338
376/436
3,944,468 A 3/1976 Duret et al.
4,038,138 A * 7/1977 Linning ................ G21C 3/338
376/436

OTHER PUBLICATIONS

Written Opinion of corresponding international application No. PCT/RU2017/000638 dated Dec. 21, 2017, 5 pages (English Translation); 4 pages (Russian).
International Preliminary Report on Patentability of corresponding international application No. PCT/RU2017/000638 dated Mar. 5, 2019, 6 pages (English); 5 pages (Russian).

* cited by examiner

FAST-NEUTRON REACTOR FUEL ROD

CROSS-REFERENCE TO RELATED APPLICATION

This application is the U.S. national phase of PCT Application No. PCT/RU2017/000638 filed on Sep. 1, 2017, which claims priority to Russian Patent Application No. RU 2016135828 filed on Sep. 5, 2016, the disclosures of which are incorporated in their entirety by reference herein.

FIELD OF THE INVENTION

The invention relates to nuclear technology and may be used in preparing fuel rods and jacket fuel assemblies for cores of fast-neutron reactors utilizing a liquid-metal coolant.

BACKGROUND OF THE INVENTION

It is known a fuel rod to form fuel assemblies of fast-neutron reactors utilizing a liquid-metal coolant. The fuel rod comprises nuclear fuel which is arranged in a hermetically-sealed container in the form of a thin-walled tubular shell made of chromium steel and end components. The fuel rod also comprises a spacer element in the form of a wire which is wound in a wide-pitch coil along an outer surface of the shell and which is secured at the ends of the fuel rod to the shell or to the end components. The spacer element is configured to form fuel assemblies in the form of a bundle of parallel fuel rods which are regularly (with a pre-defined relative pitch) spaced across the cross-section of the fuel assemblies and are arranged inside a fuel assembly jacket. This fuel rod and the fuel assembly configuration has been successfully accepted in sodium-cooled fast-neutron reactors of the BN-type. In the reactors of the BN-type, an outer diameter of a tubular shell is varied in the range from 5.9 mm to 7.5 mm, a shell thickness is about 0.3 mm, and a diameter of a wire used to produce a spacer element defining a minimal distance between shells of adjacent fuel rods within a triangular array of fuel assemblies is about 1 mm. However, such fuel rod configuration has drawbacks when used in fuel assemblies for designed lead-cooled fast-neutron reactors utilizing uranium-plutonium nitride fuel. These drawbacks arise because, in order to provide optimal characteristics of such reactor cores, the distance between shells of adjacent fuel rods is much greater than that in liquid-metal cooled BN reactors. For instance, an outer diameter of a shell for a developed BR-1200 reactor can be more than 10 mm, and a distance between adjacent fuel rods in a fuel assembly can be more than 3 mm. In this case, when using the known configuration of fuel rods for the BR-1200 reactor, a stainless steel wire of about 3 mm in diameter is wound around a thin-walled tube. Such fuel rod configuration significantly increases metal content consumed per fuel assembly, thus, deteriorating neutron and physical characteristics of a reactor core. Moreover, a heavy wire wound under a specified tension across a surface of a thin-walled shell can significantly deform the geometric shape of the fuel rod, e.g., it can be distorted or otherwise deformed. Another drawback of such fuel rod configuration is that the spacer element is rigid in its transverse section plane.

It is known the fuel rod to form fuel assemblies for fast-neutron reactors with the liquid-metal coolant, comprising nuclear fuel which is disposed in the hermetically-sealed container in the form of the thin-walled steel shell with end components and the spacer element, which is arranged on the outer surface of the shell and secured to the ends of the fuel rod (GB1459562). The spacer element is a wire coil in the form of a spring which is, in turn, wound in a wide-pitch coil around the shell outer surface. Such configuration helps to maintain the desired distance between adjacent fuel rods of a fuel assembly with a relatively low metal consumed per element. However, to produce the spacer element in the fuel rod with such configuration a relatively thin wire with the length several times higher than that of the fuel rod is used. That is why when a metal-coolant of the reactor core is heated up to operating temperatures, the total wire length greatly increases resulting in possible local geometric distortions of the coil and in a displacement of coil turns with respect to the surface of the tubular shell. Due to this, the risk of multiple focal fretting-corrosion points formed at contact points between movable spring turns and the tubular shell is increased.

It is known a fuel rod to form fuel assemblies for fast-neutron reactors utilizing a liquid-metal coolant, comprising nuclear fuel which is arranged in a hermetically-sealed container in the form of a thin-walled steel tubular shell and end components. A spacer element secured to the end components of the fuel rod is wound around a surface of the shell (U.S. Pat. No. 3,944,468). The spacer element is made as two intercoupled components—a thin-walled tube and a reinforcing wire arranged inside the tube. In addition, the end components comprise only the wire attached thereto, and the tube is pressed between the wire and an outer surface of the shell at the stage of fuel rod production. This configuration allows properties and functions of the spacer element to be distributed between two components thereof by which the desired complex of properties is provided. The required longitudinal strength of the spacer element is provided by selecting a wire diameter. The desired spacing between fuel rods in the fuel assemblies is provided by selecting an outer diameter of the tube. The spacer element deformation and radial compensation of fuel swelling are provided by means of a small tube wall thickness. The drawbacks of this configuration include the configuration complexity, the relatively high metal consumption and the increased risk of accumulation of impurities from the coolant in a narrow gap between the wire, and the tube, and a risk of lead coolant stagnant regions to be formed inside the tube. This considerably increases the risk of local superheating in the shell and corrosion centers in the lead coolant in the points of contact between the shell, the wire, and the tube.

The technical effect of the present invention consists in reducing the metal consumed per spacer element and fuel rod. Said technical effect helps to improve neutron and physical parameters of a fast-neutron reactor core.

SUMMARY OF THE INVENTION

The technical effect of the present invention is achieved by that in a fast-neutron reactor fuel rod (comprising nuclear fuel disposed in a sealed housing in the form of a thin-walled tubular steel shell and end parts, and a spacer element wound in a coil with a large pitch on the outside surface of the shell and fastened to the ends of the fuel rod on the end parts; wherein inside the tubular shell additional components can be arranged, such as fuel pellet holders or inserts made of non-fissile materials, a metal melt, etc.), the spacer element is in the form of a metallic band twisted around the longitudinal axis of the band, the width on the transverse axis of said band being approximately equal to the minimum distance between adjacent fuel rods in a fuel assembly of the nuclear reactor, the area of cross-section of the band being within a range of from 0.1 to 0.5 times the area of a circle described around said section.

In the below description of the present invention said spacer element made in the form of a metallic band twisted around the longitudinal axis of the band is named for the sake of brevity as "twisted band" (hereinafter without the quotation marks).

The twisted band with the width on the transverse axis of approximately minimal distance between adjacent fuel rods ensures reliable spacing between such fuel rods in a fuel assembly of the nuclear reactor.

The lower limit of the cross-sectional area of the twisted band is 0.1 times the area of a circle described around said section, this value is determined by the need to provide the twisted band with the specific stiffness to keep the predefined shape. The upper limit of the cross-sectional area of the twisted band is 0.5 times the area of said circle section, this value is determined by the need to reduce the metal consumed per spacer element.

The possible embodiments of the fuel rod include the following features:

The direction of band twist around a longitudinal axis and the direction of winding the spacer element coil on a fuel rod in the fuel rod configuration according to the present invention may be the same or opposite to each other. Both variants of the fuel rod with said specific features of twist and winding directions provide effective spacing between fuel rods in a fuel assembly of a nuclear reactor.

The spacer element is made of the same material as the tubular shell. Due to such spacer element design, a proved and corrosion resistant material with optimal characteristics under coolant operating temperatures can be used in a reactor core.

Edges of the twisted band are rounded to avoid mechanical damages of shells in adjacent fuel rods under vibrations of fuel rods in the reactor core.

BRIEF DESCRIPTION OF DRAWINGS

The present invention is explained by drawings shown in FIGS. 1-11.

EMBODIMENTS OF THE INVENTION

Figure 1:
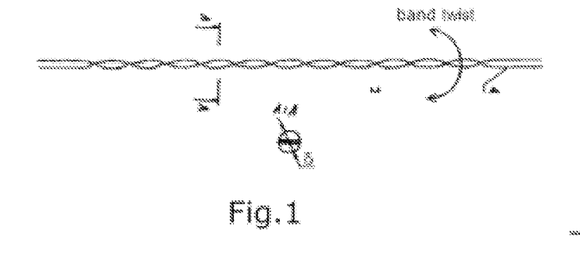
FIG. 1 shows a twisted band prior to been wound on a fuel rod. Section A-A shows the transverse cross-section of the band having a width 8.
Figure 2:
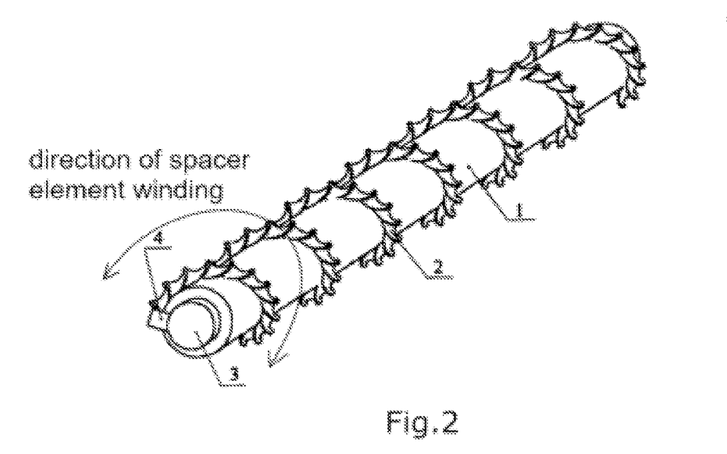
FIG. 2 shows a fuel rod where a spacer element is wound and a band is twisted in the same directions.
Figure 3:
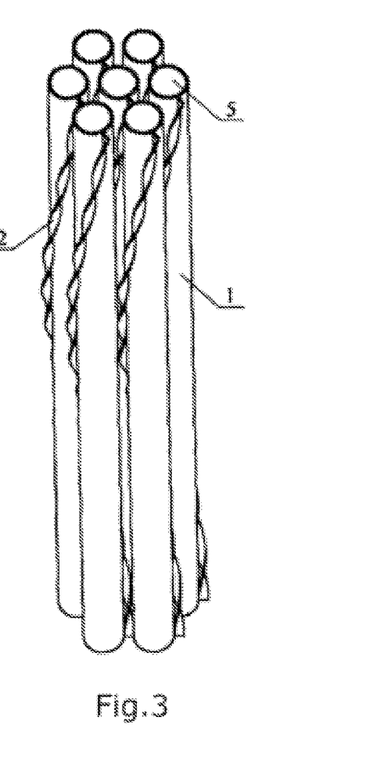
FIG. 3 shows seven fuel rods with spacer elements in the form of twisted bands of rectangular cross-section arranged therebetween.
Figure 4:
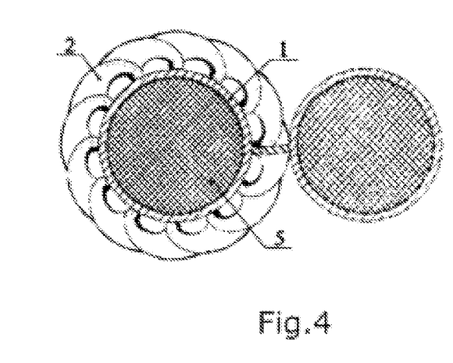
FIG. 4 shows a schematic view of spacing a fuel rod with respect to an adjacent fuel rod where spacer element winding and band twist directions match.
Figure 5:
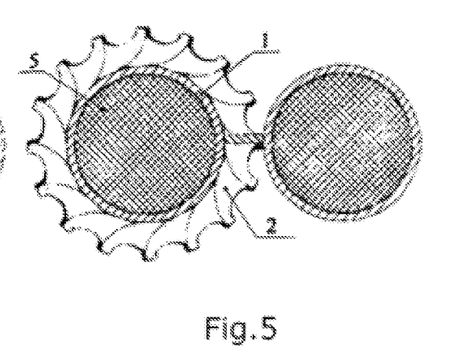
FIG. 5 shows a schematic view of spacing a fuel rod with respect to an adjacent fuel rod where spacer element winding and band twist directions are opposite.

A fuel rod according to one of the embodiments of the present invention (see FIG. 2, FIG. 4 and FIG. 5) comprises a shell (1) which has ends sealed with end components (3). A spacing element comprising a twisted band (2) and end sections (4) is wound around an outer surface of the shell (1) as a wide-pitch coil. The end sections (4) are welded to the end components (3). Nuclear fuel (5) and, if necessary, other components and materials, such as fuel holders, elements made of non-fissible materials, metal melts in a gap between a fuel and the shell, etc. (not shown), are arranged inside the shell (1).

To ensure that the fuel rod will be effectively spaced from each of the adjacent fuel rods per every pitch of the spacer element winding on the shell, a twist pitch of a twisted band is defined by the formula:

$$S_2 = \frac{\sqrt{S_1^2 + (\pi \cdot (d + \delta))^2}}{N}, \quad (1)$$

where $S_2$ is the band twist pitch of the band twisted around the longitudinal axis, $S_1$ is the winding pitch of the spacer element on the tubular shell, which is determined based on the condition of vibration strength of a bundle of fuel rods in a fuel assembly;

d is the outer diameter of the tubular shell;

δ is the transverse width of the twisted band;

N is the number of full turns of the twisted band twisted with the pitch $S_2$ per a pitch $S_1$, where this number is determined by the following formulas:

for the unidirectional winding $$N = N_0 = 1 + 6 \cdot n; \quad (2)$$

for the oppositely directed winding $$N = N_p = 1 + 6 \cdot n, \quad (3)$$

where n is the number selected from 1, 2, 3, 4, 5, 6, 7, 8, 9, 10. In addition, the larger n provides a smaller possible deviation between the spacer element and adjacent fuel rods, which can be caused by dimensional errors in the manufacture of the fuel rods and fuel assembly.

Appendix 1 shows how formulas (1), (2), and (3) have been derived.

However, the value of n to be selected is constrained by the acceptable relative elongation of the twisted band material during plastic deformation of the material in the region of longitudinal edges when twisting. That is why the value of n must satisfy the condition:

for the unidirectional band twist and spacer element winding $$n \leq \frac{\frac{\sqrt{S_1^2 + (\pi \cdot (d + \delta))^2}}{\pi \cdot \delta} \cdot \sqrt{\left(\frac{\delta_5(t_{manuf})}{K_{safety}} + 1\right)^2 - 1} - 1}{6} \quad (4)$$

for the oppositely directed band twist and spacer element winding $$n \leq \frac{\frac{\sqrt{S_1^2 + (\pi \cdot (d + \delta))^2}}{\pi \cdot \delta} \cdot \sqrt{\left(\frac{\delta_5(t_{manuf})}{K_{safety}} + 1\right)^2 - 1} - 2}{6} \quad (5)$$

where $\delta_5(t_{manuf})$ is the breaking elongation for the band material at manufacturing temperature (twisting);

$K_{safety}$ is the safety coefficient in terms of the permissible elongation during band twisting.

How formulas (4) and (5) have been derived is shown in Appendix 2.

The calculation of the dependence of the possible deviation between the spacer element and adjacent fuel rods using the twisted band is given in Appendix 3.

Exemplary embodiments of the fuel rod according to the present invention are described below.

Example 1. A fuel rod with a shell having an outer diameter 10.5 mm and a thickness 0.5 mm, and a spacer element (2) in the form of a band with a rectangular cross-section 2.6×0.5 mm having rectangle corners rounded with the radius 0.25 mm. The shell (1) of the fuel rod and the spacer element (2) are made of steel, which is highly corrosion-resistant in a lead coolant environment. The band is cooled-twisted around a longitudinal axis at a pitch of 8.2 mm (the pitch is calculated by formulas (1), (2) and (4)), for instance, by drawing it through a rotating nozzle. Meanwhile, the relative deformation of the band material in the region of longitudinal edges is 42.7% (by analogy with a sheet of steel 10X18H9, an adopted maximum allowable relative deformation at 20° C. is 50% and the safety coefficient is 1.1). With such pitch, one coil turn can receive 19 small turns of the twisted band. After that, the band (2) is wound on the tubular shell (1) at a winding pitch of 250 mm and the winding direction matches the direction of the band twist around the central longitudinal axis and is fixed at the end elements (4) to the end components (3) of the fuel rod.

Example 2. A fuel rod is produced with a spacer element (2) having dimensions of Example 1. For the production purposes, a band having dimensions of Example 1 is used. The band is twisted around the longitudinal axis at a pitch of 7.9 mm and is wound on the tubular shell (1) at a winding pitch of 250 mm and the winding direction is opposite to the direction of the band twist around the central longitudinal axis, and is fixed at the end elements (4) to the end components (3) of the fuel rod.

Example 3. A fuel rod is produced with a spacer element in the form of a twisted band with provision for possible extreme deviations of geometrical dimensions of the fuel rod and spacer element which are included in a fuel rod and fuel assembly design for the reactor system BN-1200. The rectangular cross-section of the band is 2.56×0.5 mm. The outer diameter of the fuel rod is 10.53 mm. The winding pitch of the spacer element on the tubular shell is 258.3 mm. The band is twisted around the longitudinal axis at the pitch of 20.10 mm and is wound on the tubular shell. In this case, according to the procedure in Appendix 2, it can be seen that in the most unfavorable combination of the fuel rod and fuel assembly manufacturing errors, a maximum possible displacement of an adjacent fuel rod from its nominal position will be 0.16 mm.

The inventive configuration allows the considerable reduction of metal consumed per fuel rod by means of a spacer element made in the form of a twisted band. For instance, in a reactor core comprising fuel rods with a shell outer diameter of 10.5 mm, where said fuel rods are spaced within triangular array sites at the pitch of 13.1 mm, for spacing a twisted band with a cross-section of 2.6×0.5 mm, the relative metal consumption (the ratio of spacer element volumes) of the twisted band compared to a spacer wire having a diameter of 2.6 mm is 24.5%. The relative metal consumption of the twisted band compared to a tube of 0 2.6×0.5 mm will be 39.4%, and compared to a tube of 0 2.6×0.3 mm will be 60.0%.

Moreover, an important additional technical effect of the present invention is an additional turbulization of coolant flow in a fuel assembly consisted of fuel rods which use spacer elements in the form of twisted bands. The additional turbulization of the coolant flow is generated due to the twist of the bands around axes thereof, and it allows reducing the risk of formation and a surface area of coolant stagnant regions and, accordingly, "hot spots" on the tubular shell.

Said technical effects help to improve neutron and physical characteristics and the reliability of the fast-neutron reactor core. Said features of the technical solution allow assuming the possibility of its practical application in the manufacture of a fuel rod and fuel assemblies for lead-cooled fast-neutron reactors.

Appendix 1

Let's derive a formula for winding pitches depending on the geometrical parameters of a fuel rod bundle and a spacer element. Generally, there are several possible situations:

Spacing only in one direction, and a contact in the same direction is reproduced over each pitch of the large coil;

Spacing is ensured in three directions, i.e., at one pitch of the large coil a wire contacts alternately a fuel rod in the direction of 0°, a fuel rod in the direction of 120°, and a fuel rod in the direction of 240°;

Spacing is ensured in six directions, i.e., at one pitch of the large coil a wire contacts alternately all adjacent fuel rods (the last case is of particular interest).

For a start, let's derive some equations of geometrical parameters. Let's associate a fuel rod to a coordinate system. Analyze one turn of a large coil. A parametric equation will be as following:

$$\begin{cases} r = \dfrac{s}{2} \\ \varphi(t) = 2 \cdot \pi \cdot t', \text{ where } 0 \leq t \leq 1 \\ z(t) = s_1 \cdot t \end{cases} \quad (1)$$

where $s = d|\delta$ is the pitch of the fuel rod array;

d is the outer diameter of the tubular shell;

$\delta$ is the larger dimension of the twisted band cross-section;

$S_1$ is the pitch of the full turn of the large coil (the winding pitch on the tubular shell);

t is the equation parameter.

The equation in the Cartesian coordinates (1) will be as follows $$\begin{cases} x(t) = \dfrac{s}{2} \cdot \cos(2 \cdot \pi \cdot t) \\ y(t) = \dfrac{s}{2} \cdot \sin(2 \cdot \pi \cdot 2), \text{ where } 0 \leq t \leq 1 \\ z(t) = S_1 \cdot t \end{cases} \quad (2)$$

By developing the coil turn, an equation for the length along the large coil depending on the t parameter can be obtained:

$$L(t) = \sqrt{S_1^2 + (\pi \cdot s)^2} \cdot t. \quad (3)$$

A tilt of a tangent of the large coil to a plane of the fuel rod cross-section (in other words, an angle of coil axis tilt to the horizon) will be:

$$\alpha = \arcsin\left(\frac{1}{\sqrt{1+\left(\frac{\pi \cdot s}{S_1}\right)^2}}\right) \quad (4)$$

The equation of a turning angle of the twisted band cross-section around the coil when moving along the turn is as follows:

$$\theta(t) = 2 \cdot \pi \cdot \frac{L}{S_2} \cdot t, \quad (5)$$

where $S_2$ is the pitch of one turn of the twisted band (the band winding pitch). To achieve the perfect contact, at each pitch of large coil the twisted band must contact alternately all 6 adjacent fuel rods every 1/6 of the pitch. Meanwhile, the angle of turning of the cross-section must be as follows:

—0 for a first adjacent fuel rod;

$$-\frac{\pi}{3} + 2 \cdot \pi \cdot n_1,$$

where $n_1$ is a random integer- for a second adjacent fuel rod;

$$-\frac{2 \cdot \pi}{3} + 2 \cdot \pi \cdot n_2\text{- for a third adjacent fuel rod;}$$

$$-\pi + 2 \cdot \pi \cdot n_3\text{- for a fourth adjacent fuel rod;}$$

$$-\frac{4 \cdot \pi}{3} + 2 \cdot \pi \cdot n_4\text{- for a fifth adjacent fuel rod;}$$

$$-\frac{5 \cdot \pi}{3} + 2 \cdot \pi \cdot n_5\text{- for a six adjacent fuel rod.}$$

Consider the first turn of the large coil. For each contact point, the t is 0, 1/6, 2/6, 3/6, 4/6 5/6. By substituting these values of the parameter for the equation (5), the following equations defining contact conditions will be obtained:

$$\frac{1}{3} \cdot \frac{L}{S_2} = \frac{1}{3} + 2 \cdot n_1; \quad (6)$$

$$\frac{2}{3} \cdot \frac{L}{S_2} = \frac{2}{3} + 2 \cdot n_2;$$

$$\frac{3}{3} \cdot \frac{L}{S_2} = 1 + 2 \cdot n_3;$$

$$\frac{4}{3} \cdot \frac{L}{S_2} = \frac{4}{3} + 2 \cdot n_4;$$

$$\frac{5}{3} \cdot \frac{L}{S_2} = \frac{5}{3} + 2 \cdot n_5.$$

In addition, the parameter of s can be expressed via the fuel rod diameter and the wire section length δ. Keep in mind here, too, that the wire section length projected onto a horizontal plane $\delta_w$ is somewhat less than an actual wire section length (because the coil is somewhat inclined with respect to the horizontal plane):

$$\delta_w = \delta \cdot \sin(\alpha) = \delta \cdot \frac{1}{\sqrt{1+\left(\frac{\pi \cdot s}{S_1}\right)^2}}.$$

In this case, the equality $s=d_{fr}+\delta_w$, is satisfied, where $d_{fr}$ is the outer diameter of the tubular shell.

Based on the equations (6) a pitch of the band turning can be derived:

$$S_2 = L \cdot \frac{1}{1+6 \cdot n_1}; \quad (7)$$

$$S_2 = L \cdot \frac{1}{1+3 \cdot n_2};$$

$$S_2 = L \cdot \frac{1}{1+2 \cdot n_3};$$

$$S_2 = L \cdot \frac{2}{2+3 \cdot n_4};$$

$$S_2 = L \cdot \frac{5}{5+6 \cdot n_5}.$$

In the result, the following series for band twist pitch can be obtained:

$$\frac{S_2}{L} = \frac{1}{1+6 \cdot n}.$$

Consider a variant when the winding direction is opposite to the large coil turning direction. In this case cross-section turning angles must be as follows:

—0 for a first adjacent fuel rod;

$$-\left(-\frac{2 \cdot \pi}{3}\right) + 2 \cdot \pi \cdot n_1,$$

where $n_1$ is a random integer- for a second adjacent fuel rod;

$$-\left(-\frac{4 \cdot \pi}{3}\right) + 2 \cdot \pi \cdot n_2\text{- for a third adjacent fuel rod;}$$

$$-(-2 \cdot \pi) + 2 \cdot n_3\text{- for a fourth adjacent fuel rod;}$$

$$-\frac{8 \cdot \pi}{3} + 2 \cdot \pi \cdot n_4\text{- for a fifth adjacent fuel rod;}$$

$$-\frac{10 \cdot \pi}{3} + 2 \cdot \pi \cdot n_5\text{- for a six adjacent fuel rod.}$$

The formula for the angle of turning will be as follows:

$$\theta(t) = -2 \cdot \pi \cdot \frac{L}{S_2} \cdot t. \quad (8)$$

The following system can be obtained:

$$S_2 = L \cdot \frac{1}{2-6 \cdot n_1}; \quad (9)$$

$$S_2 = L \cdot \frac{1}{2-3 \cdot n_2};$$

$$S_2 = L \cdot \frac{1}{2 - 2 \cdot n_3};$$

$$S_2 = L \cdot \frac{2}{4 - 3 \cdot n_4};$$

$$S_2 = L \cdot \frac{5}{10 - 6 \cdot n_5}.$$

In the result, the following series for the band twist pitch around the longitudinal axis can be obtained $$\frac{S_2}{L} = \frac{1}{2 + 6 \cdot n}.$$

The obtained series of numbers 1+6·n and 2+6·n can be expressed as N. This number shows how many small turns of the twisted band are on one large coil turn.

Appendix 2

Figure 6:
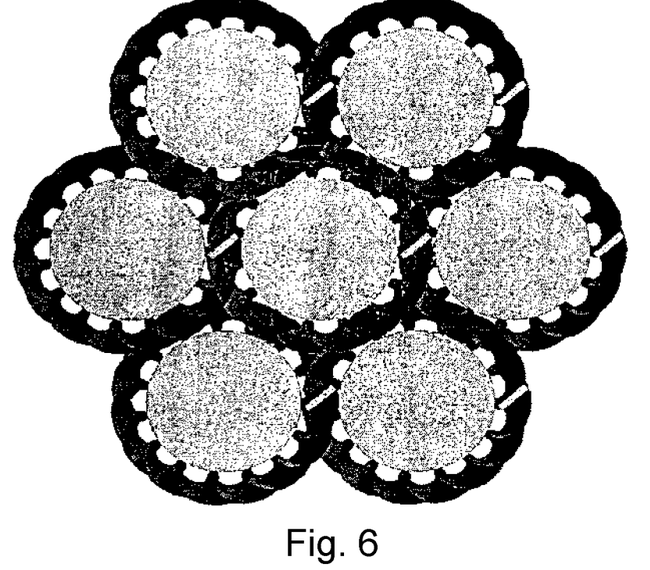
FIG. 6 shows unidirectional winding.
Figure 7:
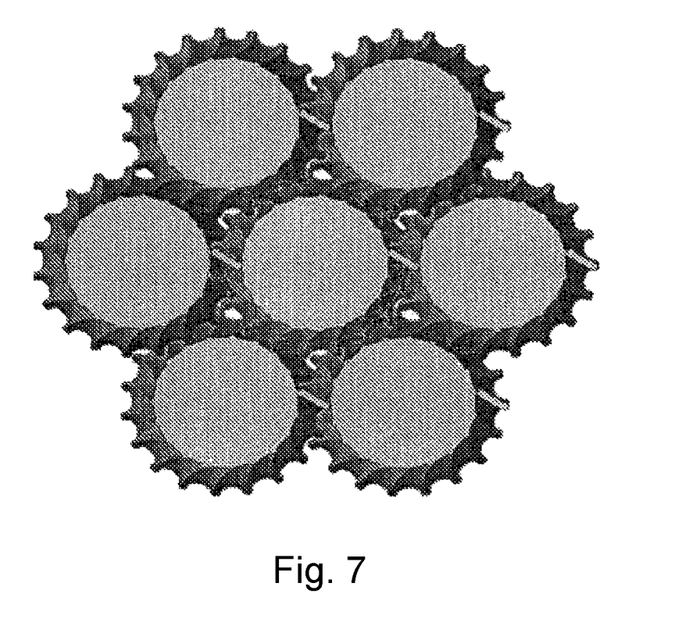
FIG. 7 shows oppositely directed winding.

FIGS. 6 and 7 show a top view of 7 fuel rods with wires (the following dimensions are used: s=12.98 mm; d=10.53 mm; $S_{big}$=258.3 mm; S=2.45 mm; $S_{small}$=30.61 mm (the values are selected considering possible geometrical tolerances). FIG. 6 shows the embodiment when the directions of the band twist and the coil winding on the tubular shell are the same, and FIG. 7 shows the embodiment when these directions are opposite to each other. The section is made at a height of 260 mm (i.e., one full turn of the large coil is shown).

Comparison of these pictures demonstrates that, generally, the unidirectional winding is more preferable because it provides a smoother envelope of the spacer band (if viewed from above). Moreover, it can be noticed that the smaller the pitch of the band twist around the longitudinal axis is, the closer the envelope is to the circle. FIG. 6 shows that, despite the tolerances and dimension deviations, the spacing is achieved for all adjacent fuel rods. The maximum possible gap is equal to the transverse width of a "hollow" between the perfect circle and the band envelope. We shall evaluate this dimension.

Figure 8:
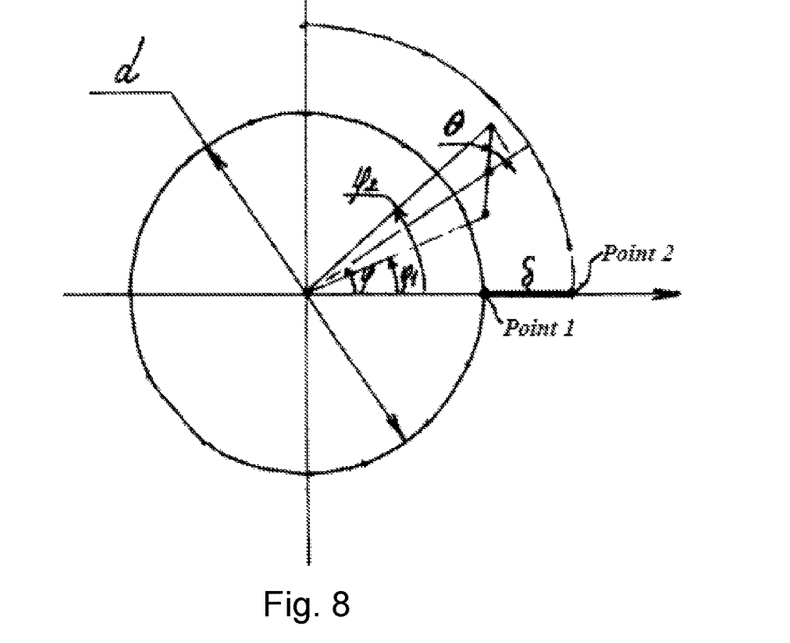
FIG. 8 shows determination of the "hollow" width.

Let's take a look at FIG. 8. Derive polar equations for points 1 and 2 (extreme points of the spacer band):

$$\varphi(t) = 2 \cdot \pi \cdot t; \quad (1)$$

$$\theta(t) = 2 \cdot \pi \cdot \frac{L}{S_2} \cdot t; \quad (2)$$

$$R_1 = \frac{d}{2} + \frac{\delta}{2} \cdot (1 - \cos(\theta)); \quad (3)$$

$$R_2 = \frac{d}{2} + \frac{\delta}{2} \cdot (1 - \cos(\theta)); \quad (4)$$

$$\varphi_1 = \varphi - \arcsin\left(\frac{\delta \cdot \sin(\theta)}{d + \delta \cdot (1 - \cos(\theta))}\right); \quad (5)$$

$$\varphi_2 = \varphi + \arcsin\left(\frac{\delta \cdot \sin(\theta)}{d + \delta \cdot (1 + \cos(\theta))}\right). \quad (6)$$

Figure 9:
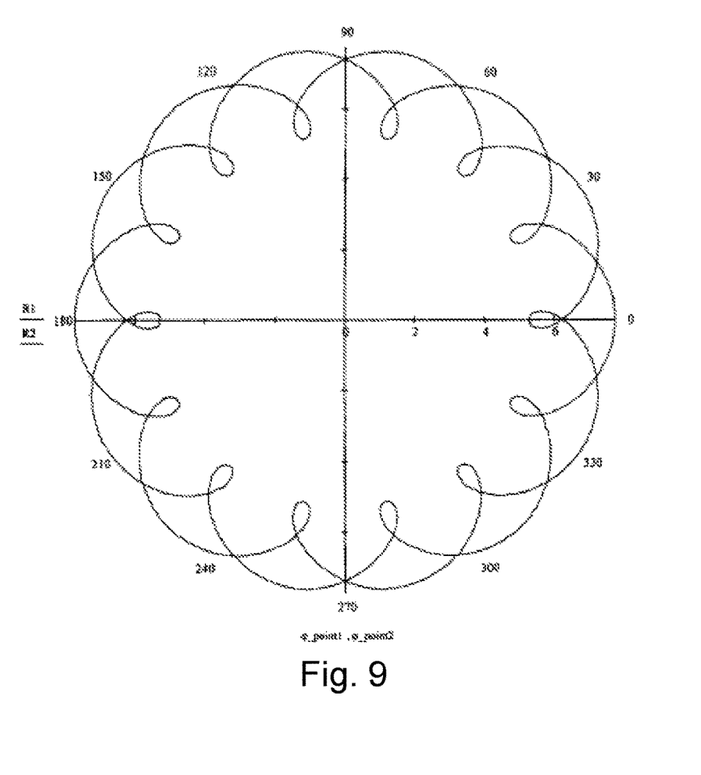
FIG. 9 shows trajectories of extreme points of the twisted band cross-section per full turn of the large coil.

Let's build lines based on the polar equations (3)-(6). The following dimensions will be used: d=10.53 mm; $S_{big}$=258.3 mm; S=2.45 mm; $S_{small}$=30.61 mm. The lines are represented in FIG. 9. FIG. 9 shows how to define the "hollow" dimension. To do this, the radius of the intersection point is required. By making radii from the equations (3) and (4) equal, the l values corresponding to the intersection points can be found:

$$t_{inters} = \left(\frac{1}{2} + k\right) \cdot \frac{S_2}{2 \cdot L_{turn}} \quad (7)$$

where k is the natural number.

If K–0, $t_{inters}$=0.036 can be obtained. This t corresponds to the radius R=6.49 mm. Then, the transverse width of the "hollow" will be ΔR=1.22 mm.

It can be shown that the "hollow" transverse width is independent of the number of times the band is twisted around the axis of the band on the large coil pitch. If the value of the $t_{inters}$ from the equation (7) is substituted for the equation (3) or (4), then $$R_{hol} = \frac{d}{2} + \frac{\delta}{2}.$$

In this case, $$\Delta R = \frac{\delta}{2}.$$

However, although the "hollow" transverse width is constant, when the pitch of the band twist is small, only a part of the transverse width of an adjacent fuel rod can penetrate therein, that is why an actual minimal possible gap will be much smaller than that defined according to the (8). Let's find this gap.

Consider a first intersection point of curves in FIG. 9. The parameter of t for this point is equal to $$t_{inters1} = \frac{s_2}{4 \cdot L_{turn}}, \quad (9)$$

and a corresponding angle is co:

$$\varphi_{int\,ers} = 2 \cdot \pi \cdot t_{int\,ers1}. \quad (10)$$

Consider a circle with a diameter equal to the diameter of the fuel rod, the center of a beam exiting the origin at an angle $\varphi_{inters}$. Let this circle is spaced from the intersection point of the curve envelopes by the distance $\Delta_{gap}$. Then, the distance from the origin (the center of the fuel rod of interest) to a center of an adjacent circle (a hypothetic fuel rod in the "hollow") will be:

$$R_{center} = \left(R_{fr} + \frac{\delta}{2}\right) + \Delta_{gap} + R_{fr} = 2 \cdot R_{fr} + \frac{\delta}{2} + \Delta_{gap}. \quad (11)$$

Draw form the origin a tangent to the circle which corresponds to an adjacent fuel rod. An angle between this tangent and a beam connecting centers of the circles will be $$\Delta\varphi_{tang} = \arcsin\left(\frac{R_{fr}}{R_{center}}\right). \quad (12)$$

Draw another beam at an angle $\Delta\varphi$ to the beam connecting the centers of the circles and find distances from the origin to the intersection point of the beam and enveloping curves and to the intersection point with the adjacent circle. A calculation model is shown in FIG. 10.

Figure 10:
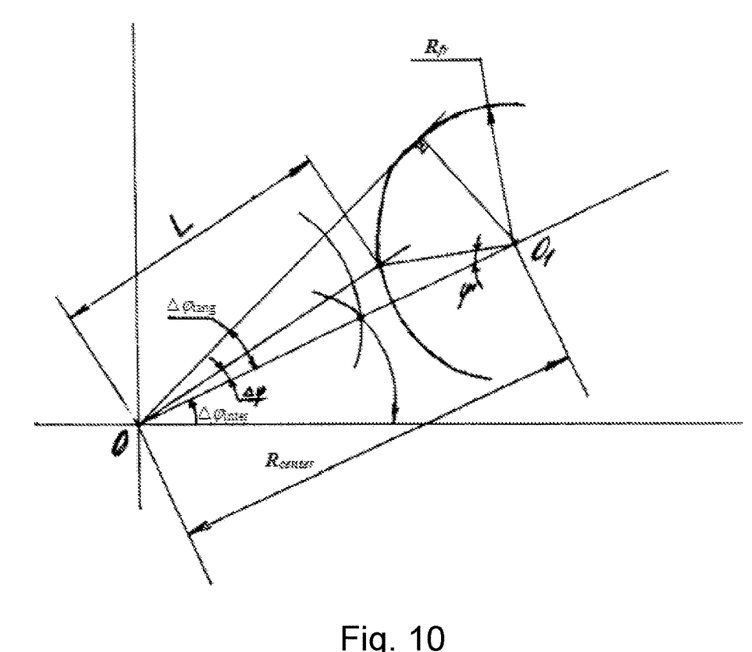
FIG. 10 shows a minimal gap calculation model.

Using FIG. 10, the following geometric relationships can be made:

$$L \cdot \cos(\Delta\varphi) + R_{fr} \cdot \cos(\rho') = R_{center}; \quad (13)$$

$$R_{center} \cdot \sin(\rho_{int\ ers}) + R_{fr} \cdot \sin(\varphi' - \varphi_{int\ ers}) = L \cdot \sin(\varphi_{int\ ers} + \Delta\varphi); \quad (14)$$

$$L \cdot \sin(\Delta\varphi) = R_{fr} \cdot \sin(\varphi'). \quad (15)$$

Figure 11:
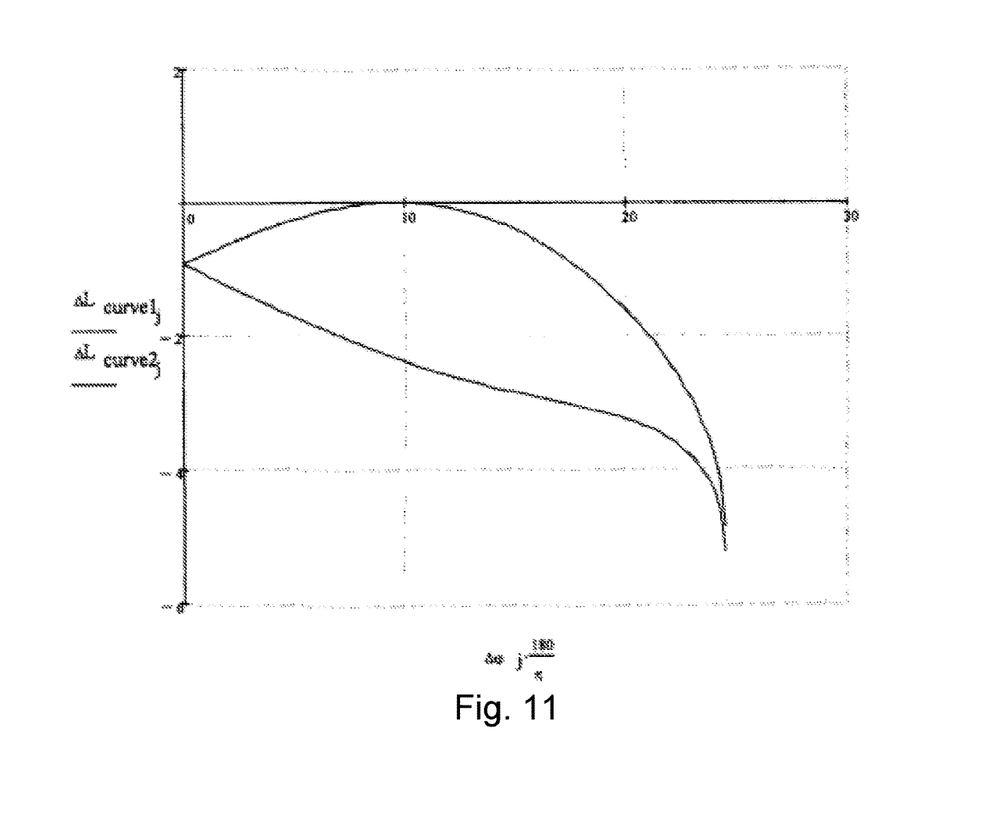
FIG. 11 shows dependence between length differences from the origin to the point of intersection with the envelope point and the adjacent circle.

Based on these equations, a quadratic equation of a relative length L can be obtained, solving which an equation for L will be obtained:

Using Mathcad, set several values of angles $\Delta\varphi$ and find differences of lengths from the origin to enveloping curves and to the intersection with the circle. Build a graph of these dependencies and find a value of $\Delta_{gap}$, at which the circle contacts the envelope. Consider, for instance, the following dimensions: $\delta=2.56$ mm; $R_{fr}=5.265$ mm; $S_{big}=258.3$ mm; $\delta-2.45$ mm; $S_{small}=1/7 \cdot L_{turn}=37.365$ mm, $\Delta_{gap}=0.91$ mm. With these dimensions, the graph of dependencies between length differences and the beam angle shown in FIG. 11 will be obtained. As can be seen in FIG. 11, with the defined $\Delta_{gap}$ the adjacent circle contacts the band envelope.

Consider how the minimum possible gap between the adjacent fuel rod and the wire envelope depends on the pitch of the band twist around the longitudinal axis. Intuitively, it seems obvious that with the reduced twist pitch the envelope approaches a circumscribed circle radius of which is $R_{fr}+\delta$. Consider several twist pitches: 1/7; 1/10 and 1/13 of the turn length. Calculation results are shown in Table 1.

TABLE 1

Minimal possible gap calculation

| Twist pitch, mm | Minimal possible gap $\Delta_{gap}$, mm | Ratio $\dfrac{\Delta_{gap}}{\dfrac{\delta}{2}}$ |
|---|---|---|
| $S_{small} = \dfrac{1}{7} \cdot L_{turn}$ | 0.91 | 0.711 |
| $S_{small} = \dfrac{1}{10} \cdot L_{turn}$ | 1.07 | 0.844 |
| $S_{small} = \dfrac{1}{13} \cdot L_{turn}$ | 1.14 | 0.891 |

As can be seen in this table, the intuitive conclusion has been confirmed. It appears that with a small band twist pitch the spacing will be guaranteed even with the most unfavorable dimension deviations. However, the twist pitch is constrained by the method of twisted band manufacturing.

Appendix 3

When a flat band is twisted into a coil, generatrices thereof passing through the extreme points of the cross-section have the biggest length. Thus, while twisted, the band material undergoes some plastic deformation. The way how a generatrix is elongated with respect to the longitudinal axis of the band can indicate a relative material elongation. By developing the extreme generatrix, the length thereof can be found $$L = \sqrt{S_2^2 + (\pi \cdot \delta)^2}, \quad (1)$$

where $S_2$ is the band twist pitch;

$\delta$ is the band transverse width (the greatest distance between the extreme points of the band cross-section, or the diameter of a circle circumscribed around the twisted band).

The initial length of the generatrix (prior to twisting) was $$L_0 = S_2 \quad (2)$$

In this case, the maximum relative elongation during band twisting will be $$\varepsilon_{max} = \frac{L - L_0}{L_0} = \frac{\sqrt{S_2^2 + (\pi \cdot \delta)^2} - S_2}{S_2} = \sqrt{1 + \left(\frac{\pi \cdot \delta}{S_2}\right)^2} - 1. \quad (3)$$

Express the twist pitch in terms of the band winding pitch on a fuel rod and fuel rod dimensions and in terms of the natural number n, according to Appendix 1:

$$\frac{S_2}{L} = \frac{S_2}{\sqrt{S_1^2 + (\pi \cdot (d+\delta))^2}} = \frac{1}{1+6 \cdot n} \quad (4)$$

for a unidirectional winding.

Rewrite the formula (3) taking into account the (4):

$$\varepsilon_{max} = \sqrt{1 + \left(\frac{\pi \cdot \delta}{\sqrt{S_1^2 + (\pi \cdot (d+\delta))^2}} \cdot (1+6 \cdot n)\right)^2} - 1. \quad (5)$$

During twisting the following condition must be satisfied:

$$\varepsilon_{max} \leq \frac{\delta_5(t_{manuf})}{K_{safety}}. \quad (6)$$

where $\delta_5(t_{manuf})$ is the breaking elongation for the band material at manufacturing temperature (twisting);

$K_{safety}$ is the safety coefficient in terms of the permissible elongation during band twisting.

Based on (5) and (6), the constraint of the allowable value n can be found:

$$n \leq \frac{\dfrac{\sqrt{S_1^2 + (\pi \cdot (d+\delta))^2}}{\pi \cdot \delta} \cdot \sqrt{\left(\dfrac{\delta_5(t_{manuf})}{K_{safety}} + 1\right)^2 - 1} - 1}{6}. \quad (7)$$

The similar formula will be obtained for oppositely directed winding, it is just necessary to do $$\frac{S_2}{L} = \frac{1}{2+6 \cdot n}. \quad (8)$$

The invention claimed is:

1. A fast-neutron lead-cooled nuclear reactor fuel assembly, comprising:
   a plurality of fuel rods, each fuel rod comprising nuclear fuel arranged in a sealed housing in the form of a tubular steel shell and end parts, and
   a spacer element wound in a coil with a specific pitch on an outside surface of the tubular steel shell and fastened to ends of the fuel rod on the end parts, wherein the spacer element is in the form of a band twisted around a longitudinal axis of the band, the width of the band transverse to the longitudinal axis being equal to the minimum distance between adjacent tubular steel shells in the fuel assembly of the nuclear reactor, a transverse cross-sectional area of the band being within a range from 0.1 to 0.5 times the area of a circle described around the width of the band,
wherein a band twist pitch is calculated by the formula $$S_2 = \frac{\sqrt{S_1^2 + (\pi \cdot (d + \delta))^2}}{N},$$

where $S_2$ is the band twist pitch of the band twisted around the longitudinal axis;
$S_1$ is the winding pitch of the spacer element on the tubular steel shell;
$d$ is the outer diameter of the tubular steel shell;
$\delta$ is the transverse width of the twisted band;
$N$ is the number of full turns of the twisted band per pitch $S_1$.

2. The fuel rod assembly according to claim 1, wherein the direction of the spacer element winding on the tubular steel shell and the direction of band twist around the longitudinal axis are the same.

3. The fuel rod assembly according to claim 1, wherein the direction of the spacer element winding on the tubular steel shell and the direction of band twist around the longitudinal axis are opposite to each other.

4. The fuel rod assembly according to claim 1, wherein the spacer element is made of steel.

5. The fuel rod assembly according to claim 4, wherein a winding direction around which the spacer element is wound on each tubular steel shell is the same as a twist direction that each band is twisted around the longitudinal axis.

6. The fuel rod assembly according to claim 4, wherein a winding direction around which the spacer element is wound on each tubular steel shell is opposite a twist direction that each band is twisted around the longitudinal axis.

7. A fast-neutron lead-cooled nuclear reactor fuel assembly comprising:
   a plurality of fuel rods, each fuel rod comprising nuclear fuel arranged in a sealed housing formed of a tubular steel shell and end parts, and
   a plurality of spacer elements, wherein each spacer is formed of a band twisted about the longitudinal axis of the band, wherein each spacer element is wound in a coil having a pitch on the outside surface of the tubular steel shell and fastened to the end parts, wherein the width of the band transverse to the longitudinal axis being generally equal to the minimum distance between adjacent fuel rods, the transverse cross-sectional area of the band being within a range from 0.1 to 0.5 times the area of a circle described around the width of the band,
wherein a band twist pitch is calculated by the formula $$S_2 = \frac{\sqrt{S_1^2 + (\pi \cdot (d + \delta))^2}}{N},$$

where $S_2$ is the band twist pitch of the band twisted around the longitudinal axis;
$S_1$ is the winding pitch of the spacer element on the tubular steel shell;
$d$ is the outer diameter of the tubular steel shell;
$\delta$ is the transverse width of the twisted band;
$N$ is the number of full turns of the twisted band per pitch $S_1$.

* * * * *

UNITED STATES PATENT AND TRADEMARK OFFICE
CERTIFICATE OF CORRECTION

PATENT NO. : 11,610,692 B2
APPLICATION NO. : 16/330715
DATED : March 21, 2023
INVENTOR(S) : Nikita Gennadevich Chernetsov et al.

It is certified that error appears in the above-identified patent and that said Letters Patent is hereby corrected as shown below:

In the Claims

Column 14, Line 3, Claim 5:
Before "The fuel rod assembly"
Delete "5"
Insert --6--; and
After "according to claim"
Delete "4"
Insert --5--.

Column 14, Line 7, Claim 6:
Before "The fuel rod assembly"
Delete "6"
Insert --7--; and
After "according to claim"
Delete "4"
Insert --5--.

Column 14, Line 11, Claim 7:
Before "A fast-neutron lead-cooled nuclear reactor"
Delete "7"
Insert --5--.

Signed and Sealed this
Twenty-third Day of May, 2023

Katherine Kelly Vidal
*Director of the United States Patent and Trademark Office*